(12) United States Patent
Jones

(10) Patent No.: US 11,951,897 B2
(45) Date of Patent: Apr. 9, 2024

(54) SHIPPING CONTAINER FASTENER AND METHOD

(71) Applicant: Sean Phoenix Jones, The Plains, OH (US)

(72) Inventor: Sean Phoenix Jones, The Plains, OH (US)

( * ) Notice: Subject to any disclaimer, the term of this patent is extended or adjusted under 35 U.S.C. 154(b) by 1 day.

(21) Appl. No.: 17/365,261

(22) Filed: Jul. 1, 2021

(65) Prior Publication Data
US 2022/0001789 A1 Jan. 6, 2022

Related U.S. Application Data

(60) Provisional application No. 63/047,309, filed on Jul. 2, 2020.

(51) Int. Cl.
*B60P 7/08* (2006.01)
*B60P 7/13* (2006.01)

(52) U.S. Cl.
CPC ............... *B60P 7/13* (2013.01); *B60P 7/0807* (2013.01); *B60P 7/0823* (2013.01)

(58) Field of Classification Search
CPC .......... B60P 7/13; B60P 7/0823; B60P 7/0807
USPC ............................................................ 410/85
See application file for complete search history.

(56) References Cited

U.S. PATENT DOCUMENTS

| | | |
|---|---|---|
| 1,286,566 A | 12/1918 | Evenson |
| 1,974,686 A * | 9/1934 | George ..................... B60P 7/13 410/84 |
| 3,083,670 A | 4/1963 | Harlander et al. |
| 3,601,866 A * | 8/1971 | Odin ................... B65D 90/0033 410/91 |
| 3,647,172 A * | 3/1972 | Van Der Molen ........ B60P 7/13 410/85 |
| 3,728,170 A | 4/1973 | Stott et al. |
| 3,841,516 A | 10/1974 | März |
| 3,860,209 A | 1/1975 | Strecker |
| 4,096,816 A | 6/1978 | Patterson, III et al. |
| 4,171,122 A | 10/1979 | Munsch et al. |
| 4,249,840 A * | 2/1981 | Kallaes ..................... B60P 7/13 410/84 |
| 4,429,840 A | 2/1984 | Chawla et al. |
| 4,537,539 A | 8/1985 | Borchardt |
| D283,674 S | 5/1986 | Paradis et al. |
| 4,732,516 A | 3/1988 | Borchardt |

(Continued)

FOREIGN PATENT DOCUMENTS

DE 90 14 696.4 U1 3/1991

*Primary Examiner* — Stephen T Gordon
(74) *Attorney, Agent, or Firm* — Jason H. Foster; Kremblas & Foster

(57) ABSTRACT

A device for fastening a container to a structure that stores or transports the container. The device has an elongated strip with first and second longitudinally-opposing ends. One end has a hook member and the other has an aperture through which a tie-down member may be extended, or another fastener for attaching a tie-down member or a tightener. The device's hook member may be inserted in a corner casting on an upwardly-facing surface of the container and the tie-down member may extend a first end through the aperture and a second end may be attached to the structure that stores or transports the container. By tightening the tie-down member, the container is drawn tightly against the structure that transports the container, which restrains the container.

10 Claims, 12 Drawing Sheets

(56) References Cited

U.S. PATENT DOCUMENTS

| | | | |
|---|---|---|---|
| 4,784,287 A * | 11/1988 | Yamada | B65D 90/047 383/41 |
| 4,894,889 A | 1/1990 | Johnson et al. | |
| D393,587 S | 4/1998 | Valerio et al. | |
| D398,220 S | 9/1998 | Woods et al. | |
| D440,144 S * | 4/2001 | Todd | D8/354 |
| 6,666,633 B2 | 12/2003 | Hsieh | |
| 7,399,148 B2 | 7/2008 | Bruun | |
| 8,157,490 B2 | 4/2012 | Park | |
| D694,096 S | 11/2013 | DeFrancisci | |
| D700,826 S * | 3/2014 | Qin | D8/367 |
| 8,695,176 B2 | 4/2014 | Gangakhedkar et al. | |
| 8,794,480 B2 * | 8/2014 | Gollnick | B65D 90/0086 220/781 |
| 9,499,237 B1 | 11/2016 | Hsieh | |
| 9,624,290 B2 | 4/2017 | Chang | |
| 10,040,601 B2 | 8/2018 | Noe | |
| 10,532,794 B2 | 1/2020 | Stefanoff et al. | |
| 2012/0224938 A1 | 9/2012 | Graf | |
| 2016/0101933 A1 | 4/2016 | Walker | |
| 2017/0334061 A1 | 11/2017 | Gallup et al. | |

\* cited by examiner

SHIPPING CONTAINER FASTENER AND METHOD

REFERENCE TO RELATED APPLICATIONS

This application claims the benefit of U.S. Provisional Application No. 63/047,309 filed Jul. 2, 2020.

BACKGROUND OF THE INVENTION

The invention relates generally to shipping container transport, and more particularly to devices and methods for fastening shipping containers to the decks and other structures of vehicles, including ships, trucks, trailers and others.

Intermodal containers, also known as ISO ("International Organization for Standardization") containers 2 (see FIGS. 1-3), are ubiquitous in the shipping and transport industry. There are criteria that must be met in order for a container to be considered an ISO container. One feature of ISO containers is corner castings 4 at every corner that are used to secure the container to a truck bed, a trailer, a ship, or to lift the container. Conventionally, shipping workers use chains 5 with or without hooks to attach to the corner castings of containers, and to attach those chains to vehicles and other structures. However, there are limitations to these fastening means that are well known.

In FIG. 3 an ISO container 2 is shown attached to a truck or trailer bed in a conventional manner. A hook on the end of a chain 5 is inserted into the upwardly facing opening on a top corner casting 4 at the right rear of the container on the right side. The chain extends down the container end at an angle to the opposite, left side rail on the truck or trailer bed. Another chain 6 is attached to the top rear corner casting on the left side of the container 2, and the chain 6 extends downwardly to the opposite, right truck or trailer bed side. Turnbuckles, winches and other mechanisms may be used to tighten the chains.

It is difficult for workers to insert chain hooks in the top corner castings of an ISO container, because ISO containers are 8-9 feet tall and it is difficult for the average-sized worker to reach the top corner casting without using a ladder or another extension. The need exists for a better mechanism for attaching containers to the structure on which they rest before, during and after transport.

SUMMARY OF THE INVENTION

Disclosed herein is a device for aiding in the securing of ISO containers to structures, such as trucks, trailers, ships and other objects to which such containers are secured during transportation and storage.

Disclosed herein is a combination of an ISO container attached to a structure. The combination comprises a first fastening device having an elongated frame with longitudinally-opposing first and second ends. The first end has a hook member inserted into a first corner casting on a surface of the ISO container that is upwardly-facing in an operable position. The second end of the elongated frame is disposed along a vertical sidewall of the ISO container in an operable position. A first tie-down member has a first member end attached to the structure and a second member end that is attached to the second end of the first fastening device.

The second member end in some embodiments extends through at least one aperture formed in the second end of the first fastening device. The first fastening device in some embodiments is at least about two feet long between the hook member and the second end, thereby extending from the first corner casting to a distance an average human user may reach. The elongated frame of the first fastening device in some embodiments is substantially parallel to the vertical sidewall of the ISO container. In some embodiments, at least a portion of the first tie-down member extends substantially parallel to the elongated frame. In some embodiments, the first member end attaches to the structure through a tie-down member tightener that is mounted to the structure.

Some embodiments comprise a second fastening device with an elongated frame having longitudinally-opposing third and fourth ends. The third end has a hook member inserted into a second corner casting on the surface of the ISO container that is upwardly-facing in operable position and spaced from the first corner casting. The fourth end of the second fastening device is disposed along a vertical sidewall of the ISO container in operable position. A second tie-down member has a third member end attached to the structure and a fourth member end attached to the fourth end of the second fastening device. The second tie-down member is oriented transverse to the elongated frame of the first fastening device.

Disclosed herein is a device for fastening an ISO container to a structure. The device comprises an elongated frame with longitudinally-opposing first and second ends. The first end has a hook member configured for inserting into an opening of a corner casting of the ISO container. At least one aperture is formed in the second end and configured to receive a tie-down member that extends from the second end of the device and attaches to the structure. The elongated frame is sufficiently rigid that the device does not deform when held vertically by the second end with the first end above the second end.

In some embodiments, the hook is defined by a first hook member that extends transverse to the elongated frame and a second hook member that extends transverse to the first hook member. This forms a gap between the elongated frame and the second hook member that is at least as wide as a corner casting wall that is disposed between the opening of the corner casting, into which the second member is configured to extend, and the exterior edge of the corner casting.

Disclosed herein is a method of fastening an ISO container to a structure. The method comprises a step of attaching a first fastening device to the ISO container. The first fastening device has an elongated frame with longitudinally-opposing first and second ends. The first end has a hook member inserted into a first corner casting on a surface of the ISO container that is upwardly-facing in operable position. The second end of the elongated frame is disposed along a vertical sidewall of the ISO container in an operable position. The method comprises a step of attaching a first member end of a first tie-down member to the second end of the first fastening device and attaching a second member end of the first tie-down member to the structure. The method comprises the step of tightening the first tie-down member, thereby tending to draw the ISO container tightly against the structure.

In some embodiments, the method further comprises attaching a second fastening device to the ISO container. The second fastening device has an elongated frame with longitudinally-opposing third and fourth ends. The third end has a hook member inserted into a second corner casting on the surface of the ISO container that is upwardly-facing in operable position and spaced from the first corner casting. The fourth end of the elongated frame is disposed along the vertical sidewall of the ISO container in operable position. The method further comprises a step of attaching a third member end of a second tie-down member to the fourth end of the second fastening device and attaching a fourth member end of the second tie-down member to the structure. The method further comprises the step of tightening the second tie-down member until the second tie-down member is oriented transverse to the elongated frame of the first fastening device, thereby tending to draw the ISO container tightly against the structure.

Figure 1:
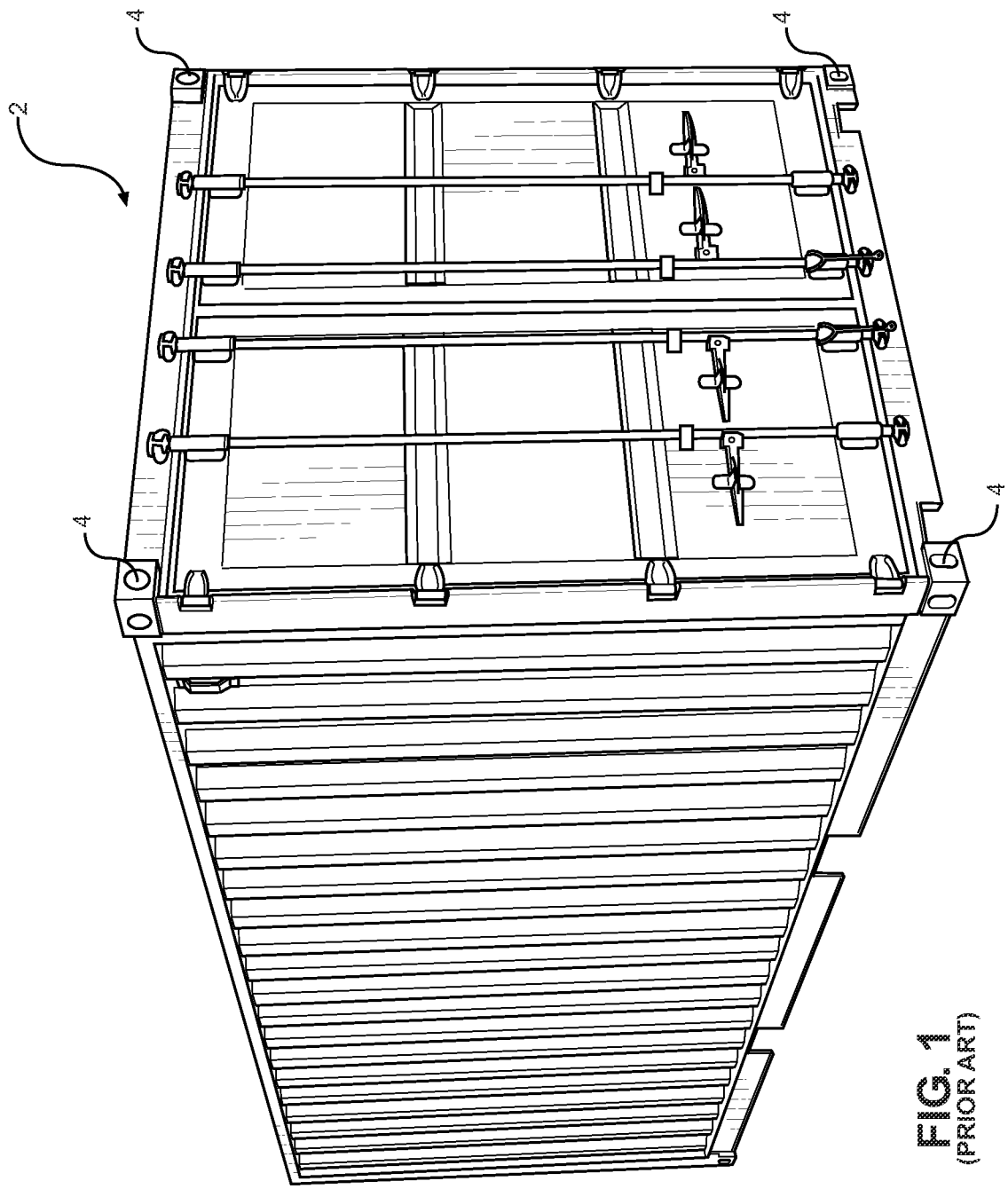
FIG. 1 is a side view in perspective illustrating a prior art ISO container.
Figure 2:
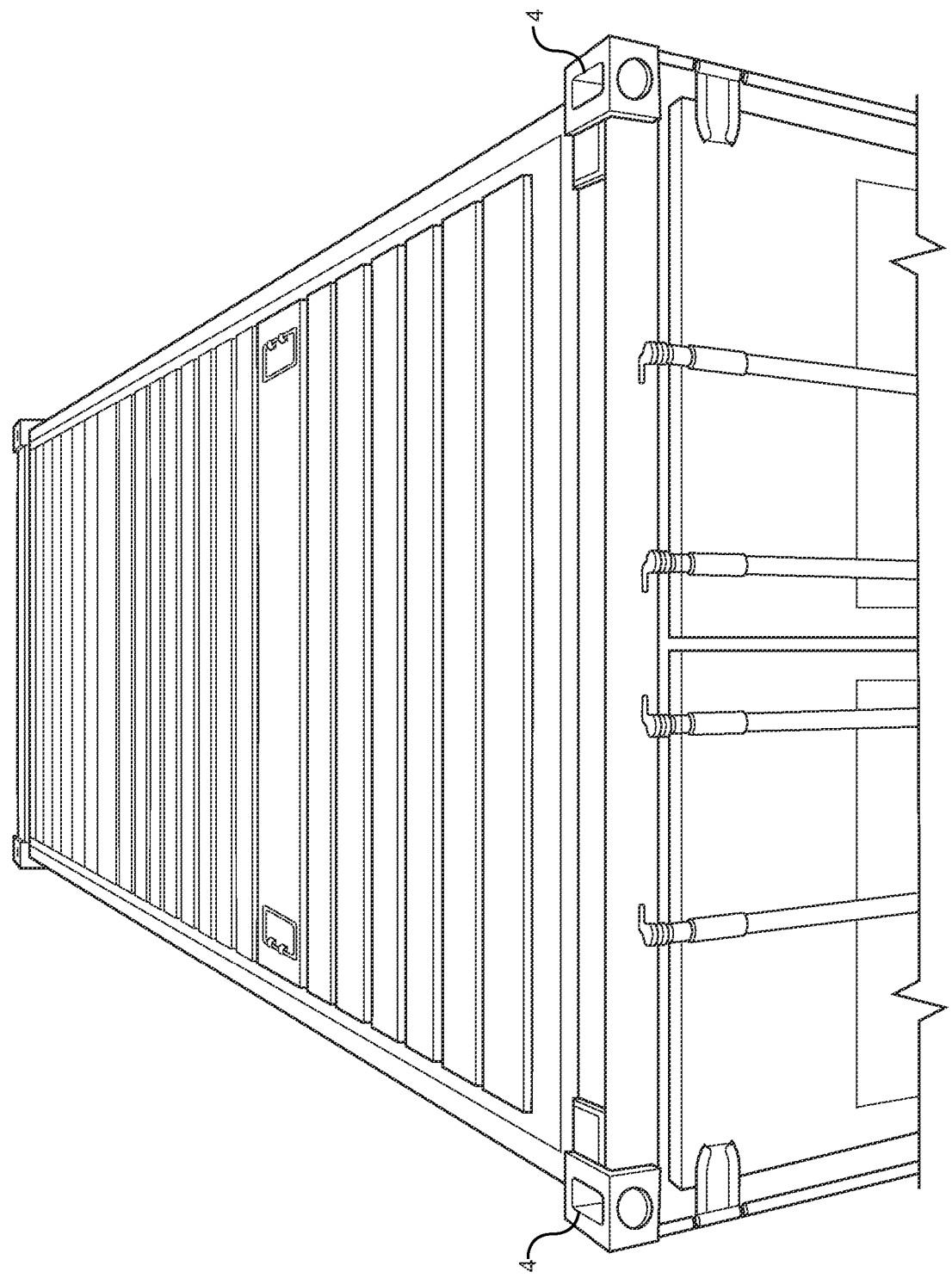
FIG. 2 is a top view in perspective illustrating a prior art ISO container's corner casting.
Figure 3:
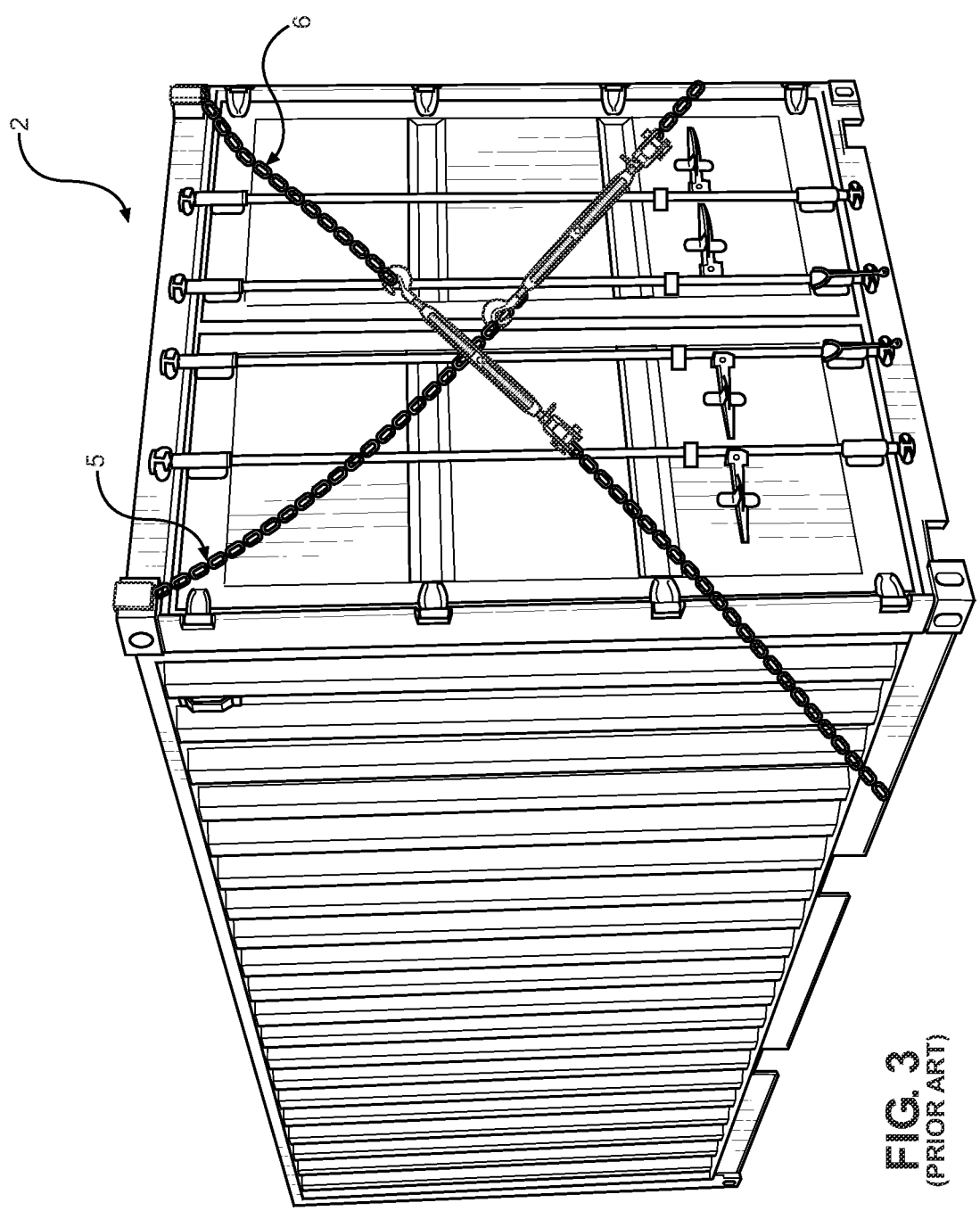
FIG. 3 is an end view in perspective illustrating a prior art ISO container.
Figure 4:
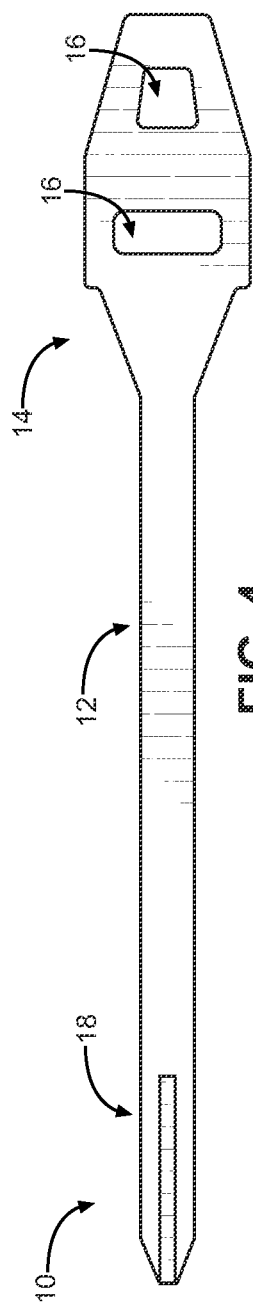
FIG. 4 is a side view illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application No. 63/047,309 filed Jul. 2, 2020, which is the above claimed priority application, is incorporated in this application by reference.

The fastening device 10 shown in FIGS. 4-7 from different perspectives has an elongated frame, such as the strip 12, with a first end 14. The strip 12 may be a plate with a thickness much less than its length and width. As an example, the strip 12 may be 36 inches long, three inches wide at its widest point (about one inch wide along most of its length) and one-quarter inch thick.

The first end 14 has openings 16 into which a chain hook, a strap or any other tie-down member may be inserted. At least one opening is formed in the end 14, and it is contemplated that multiple openings, as shown in the device 10, are formed in the end 14. Any of the openings 16, as well as other openings that may be formed therein, may be formed by cutting, molding the openings therein, or any other means by which a void may be formed. Furthermore, if other attachment modes are contemplated, then any structure that would accommodate attachment is contemplated for the first end 14.

Figures 18, 19:
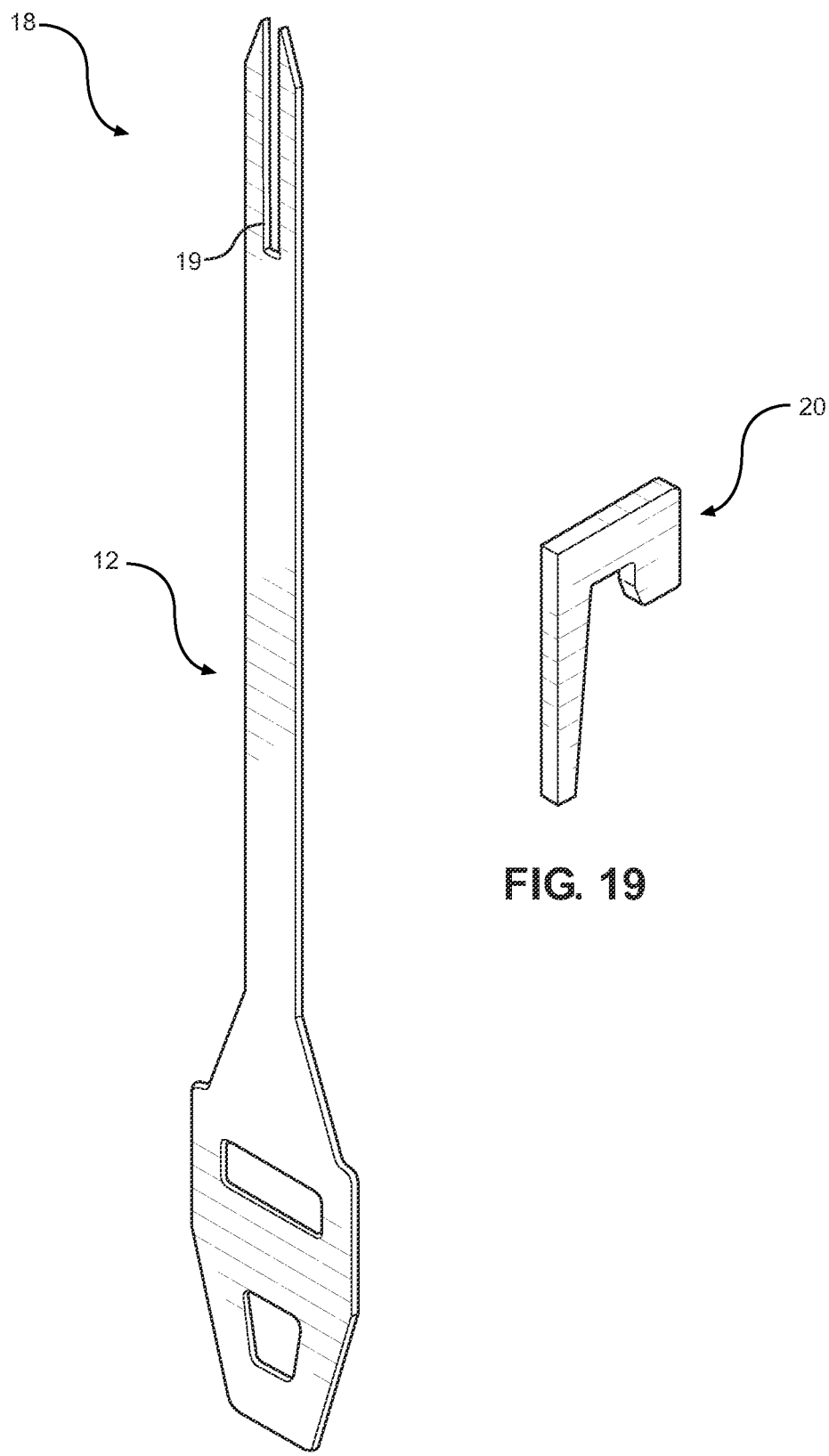
FIG. 18 is a view in perspective illustrating a strip portion of the embodiment of FIG. 4.
FIG. 19 is a view in perspective illustrating a hook portion of the embodiment of FIG. 4.

The second, opposite end 18 of the strip 12 has a hook 20 with a first member 20' that extends transversely, and preferably perpendicularly, from the longitudinal axis of the strip 12, and optionally a second member 20" that extends transversely, and preferably perpendicularly, from the first member 20' and parallel to the strip 12. The hook 20 may be welded, adhered or otherwise fastened to the strip 12, or the hook 20 may be molded as one piece with the strip 12 or otherwise integrated thereto. As shown in FIGS. 18-19, the strip 12 may have a longitudinally-oriented slot 19 formed in the end 18. The hook 20 may be a U-shaped or J-shaped plate, one side of which is inserted in the slot 19 and fixed to the slot-defining edges of the strip 12, such as by welding.

The device 10 may be made of metal, such as steel or aluminum, or it may be made of fiber-reinforced polymer or any other suitable material that is strong enough to be used in the manner described herein. The fastening device 10 may be 2-4 feet long from the tip of the first end 14 to the tip of the second end 18 in order that a worker may readily grasp the end 14 and extend the opposite end 18 to a vertically upward position distal from the worker, such as the top of an ISO container. The length of the device 10 is based on the height of the average person who will use the device 10, enabling him or her to grasp the device around the first end 14 and extend the hook 20 in the second end 18 into the aperture of a top corner casting. Because of the characteristics of the material the device 10 is made of, and the dimensions of the device 10, the device 10 is not considered flexible, inasmuch as it does not bend when held vertically by the first end 14 and extended with the second end 18 above the first end 14. The device 10 can be bent, but it preferably requires a deliberate application of more force than will be encountered in normal use.

Figure 5:
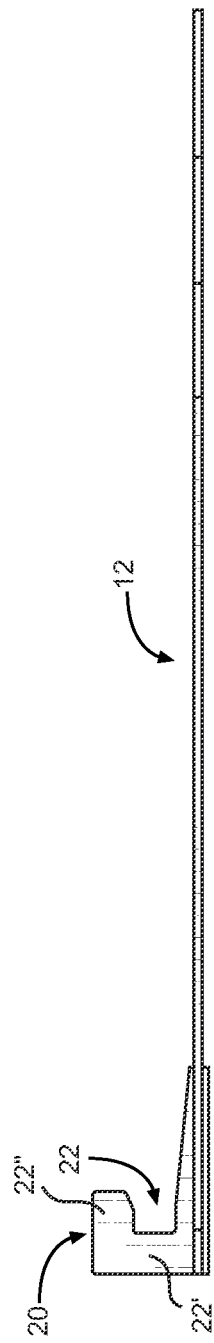
FIG. 5 is a side view illustrating the embodiment of FIG. 4.
Figure 6:
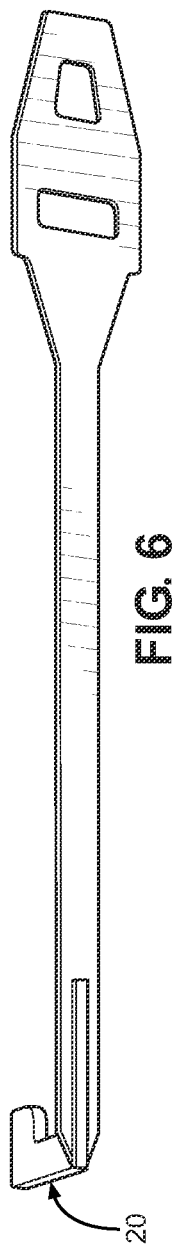
FIG. 6 is a view in perspective illustrating the embodiment of FIG. 4.
Figure 7:
FIG. 7 is a view in perspective illustrating the embodiment of FIG. 4.
Figure 15:
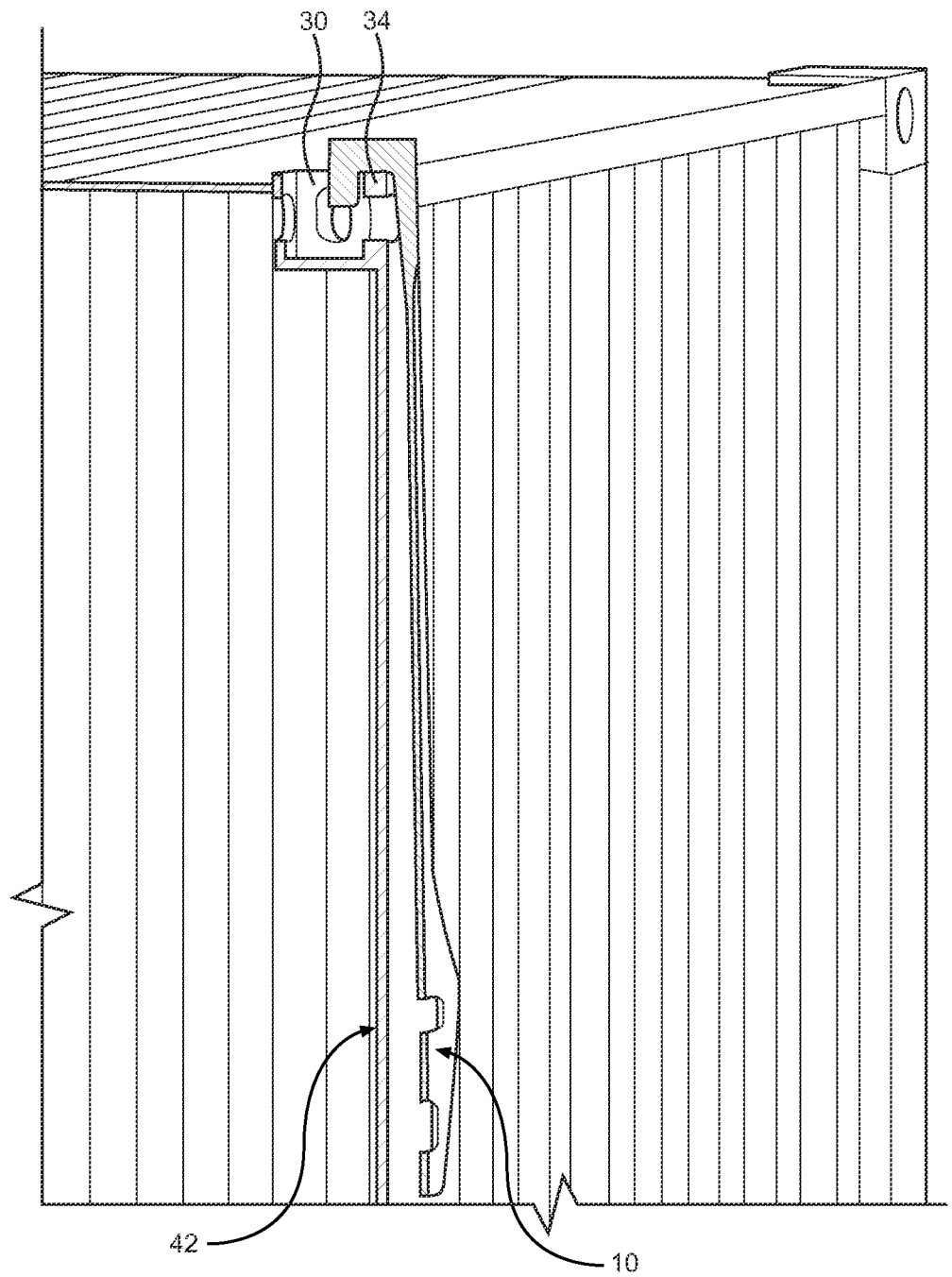
FIG. 15 is a section view in perspective illustrating the device of FIG. 10.

As shown in FIG. 5, the hook 20 has a gap 22 between the strip 12 and the second member 20". The gap 22 may be about as wide as the thickness of the member 34 (FIG. 15) that, in an operable position, is disposed between the upwardly-facing aperture 32 of the corner casting, into which the second member 20" extends, and the exterior edge of the corner casting that the device 10 is mounted to. The gap 22 may be at least as wide as, or wider than, the thickness of the above-noted member 34. This relationship in gap width and member thickness will become apparent from the explanation below and the illustrations.

Figure 8:
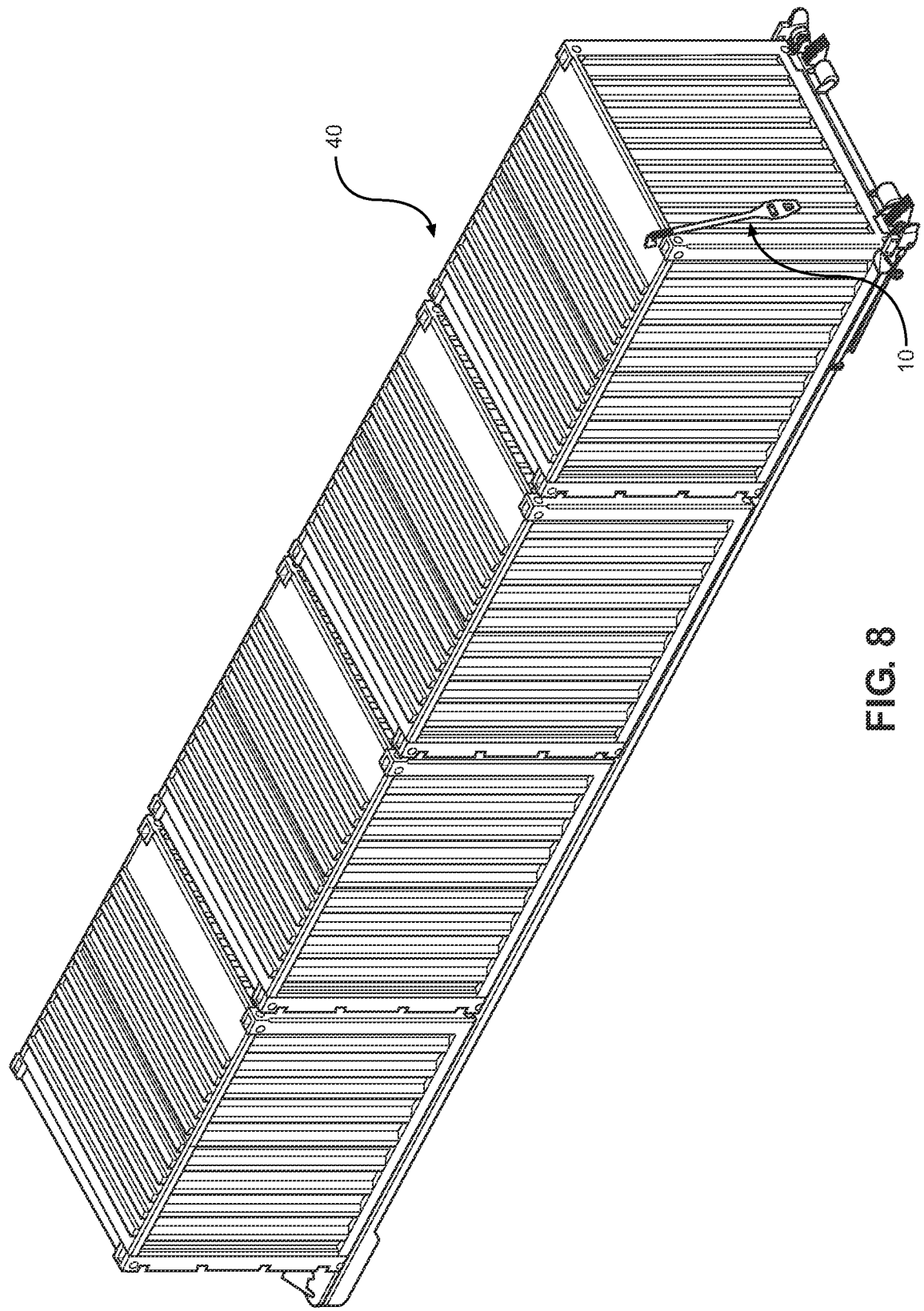
FIG. 8 is a view in perspective illustrating an embodiment of the present invention adjacent a container.
Figure 9:
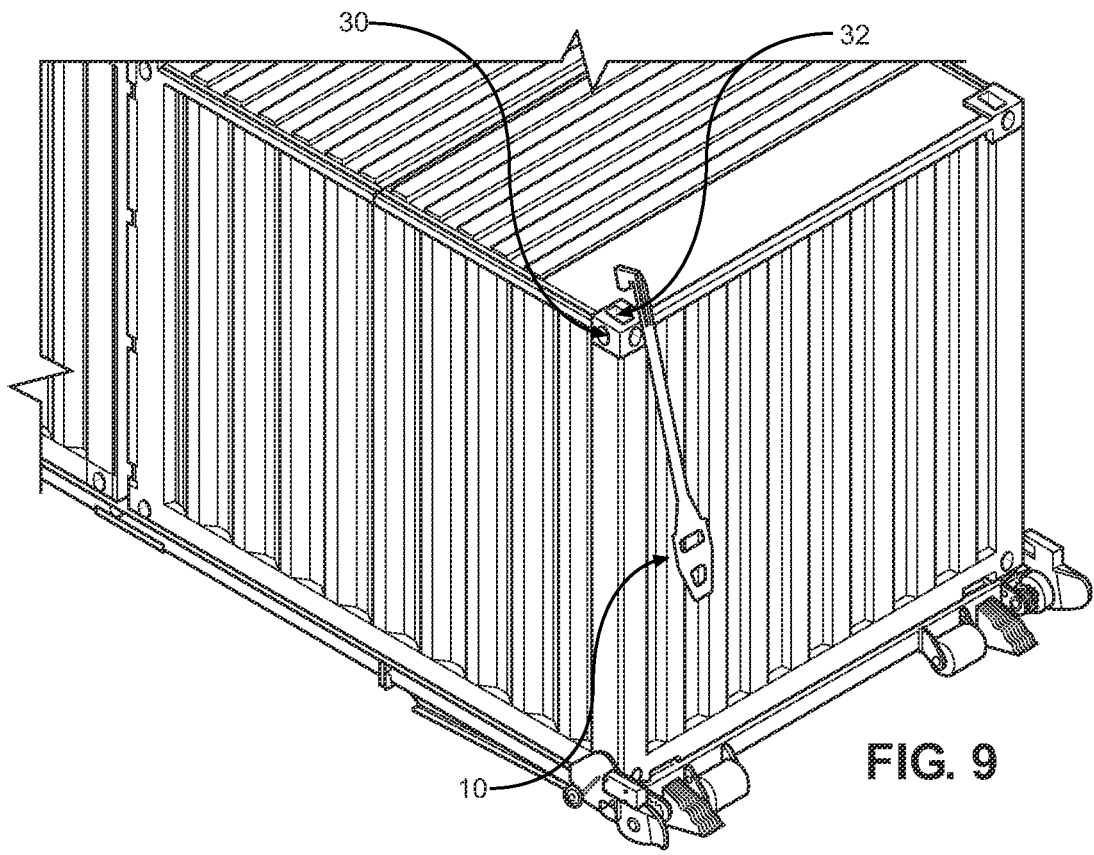
FIG. 9 is a magnified view in perspective illustrating the view of FIG. 8.
Figure 10:
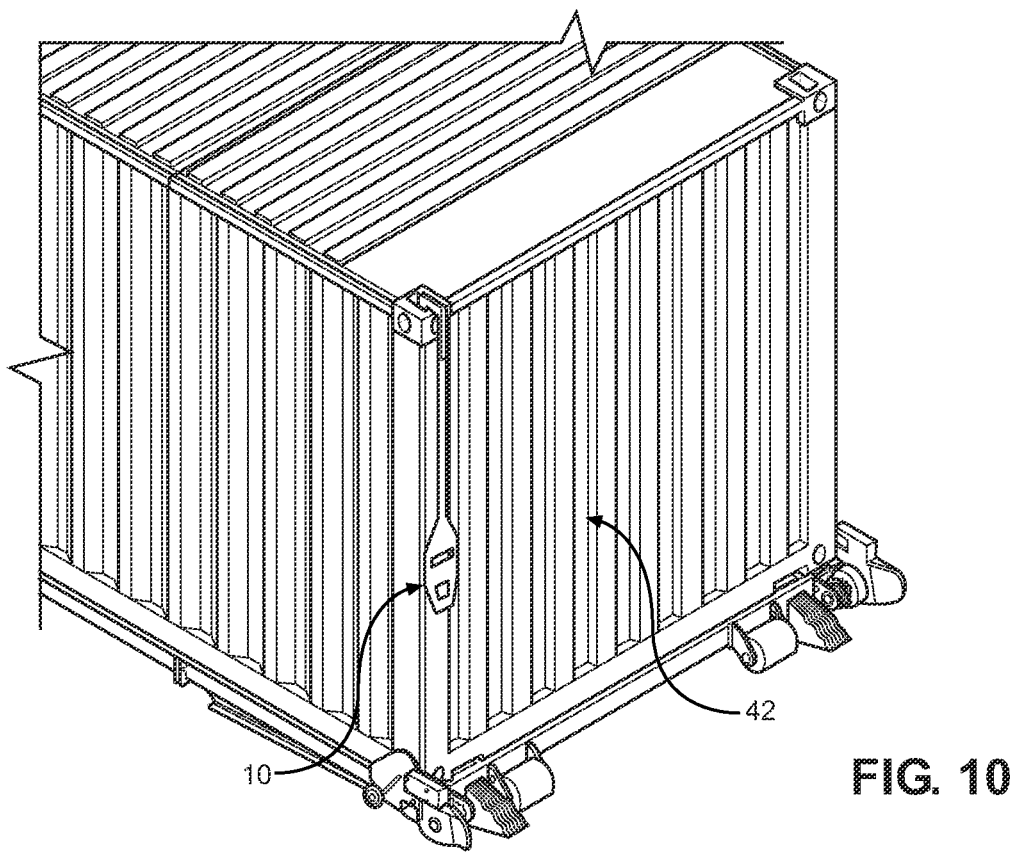
FIG. 10 is a view in perspective illustrating an embodiment of the invention in position on a container.

In an operable position, the second member 20" of the fastening device 10 may insert into an upwardly-facing aperture 32 of a corner casting 30 on an ISO container 40, as shown in the illustrations of FIGS. 8-17. FIGS. 8 and 9 show the device 10 disposed substantially vertically (in the orientation of the figures) in the position a worker grasping the lower end would hold it at the initiation of installation. The end 18 with the hook 20 is shown disposed above the top of the ISO container's corner casting 30, and in the magnified view of FIG. 9 the hook 20 is shown disposed adjacent the corner casting 30 with the hook member 20" directly above the upwardly-facing opening 32. The human operator grasps the lower end 14 of the device 10 in his or her hand or hands and raises the device 10 upwardly to the position shown in FIG. 9. The operator aligns the second member 20" with the upwardly-facing (in the FIG. 9 orientation) aperture 32 and then lowers the entire device 10 to the position shown in FIG. 10 (and in section in FIG. 15). The end 14 of the device 10 is readily grasped in the hand or hands of a human user before and while the hook 20 is being inserted in the aperture 32. In this position, the second member 20" is inserted substantially vertically into the upwardly-facing aperture 32, and the member 34 that partially defines the corner casting aperture 32 is disposed in the gap 22 of the hook 20. Once the second member 20" is located in the aperture 32, the plane of the strip 12 is disposed substantially parallel to the rear sidewall 42 of the container 40, as is apparent in FIGS. 10 and 15.

After the hook 20 is inserted in the aperture 32, a chain, a cable, a strap (such as a woven polymer tie-down strap commonly used with a strap-tightening ratchet mechanism), or any other tie-down member or fastening structure may be attached to the end 14, such as by inserting through one or more of the openings 16, or by using a bolt or any other fastener. A tie-down member is any elongated member that functions as a rope, chain, strap or cable, inasmuch as it is able to bend around corners of the ISO container but also be tightened to lash the ISO container to a structure. Once a tie-down member, such as a strap 50, is mounted to the end 14, an opposite end of the strap 50 may be mounted to a winch fixture 70 mounted rigidly on the truck, trailer or other structure to which the container 40 is mounted. The winch fixture 70 is a tie-down tightener, inasmuch as the tightener applies a tensile force along the length of the tie-down member and the device 10, thereby tightening the tie-down member. In an alternative embodiment, the opposite end of the attached strap 250, shown in FIGS. 16-17, may be extended to the side rail of the truck or trailer and fastened using a hook that is attached at the end of the chain, cable or strap. Then the tie-down member may be fastened to a conventional ratchet mechanism 70 (FIG. 13) that is the tightener that applies a tensile force at the end of the device 210. In this alternative, the tie-down is mounted directly to the truck or trailer rather than being attached to the truck or trailer through a tightener.

Figure 11:
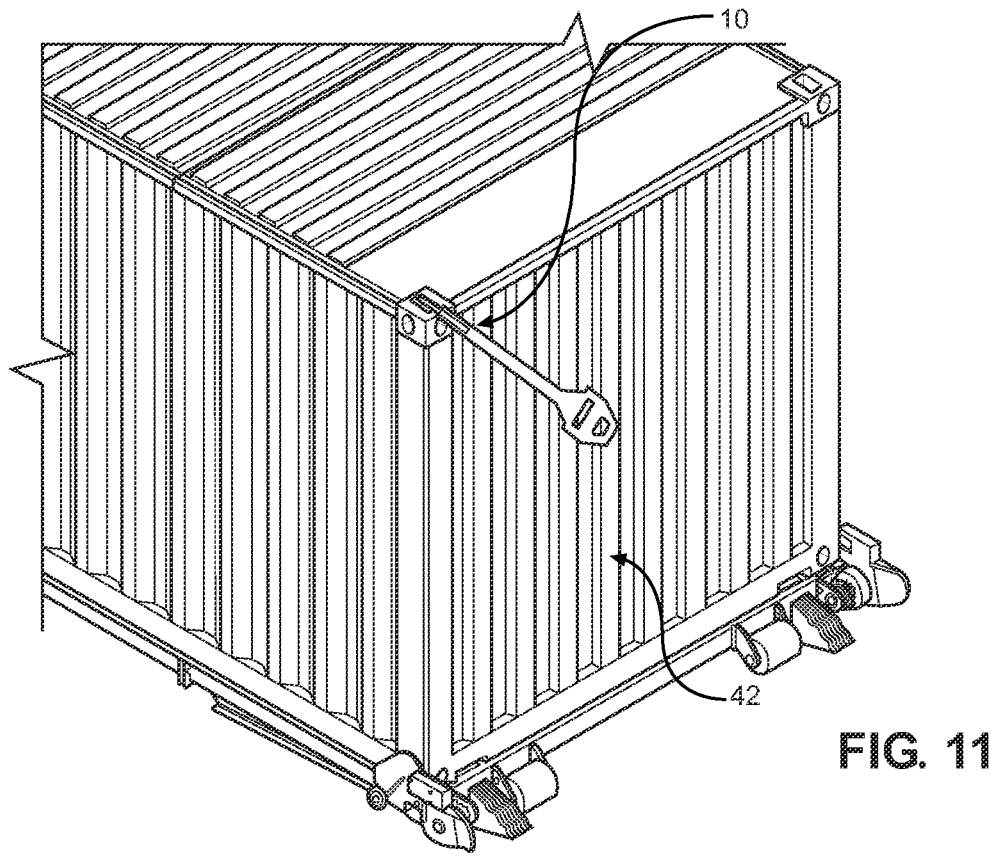
FIG. 11 is a view in perspective illustrating a subsequent step in the installation process to the position of the embodiment in FIG. 10.

Before, during or after tightening of the strap or chain, the device 10 may be pivoted within the aperture 32 to dispose the end 14 closer to the fixture 70 to which the strap is mounted, as shown in FIG. 11 (without the strap in place). The device 10 may be angled toward an opposite corner of the rear sidewall 42 to attach the opposite end of the strap, chain or other tie-down member adjacent an opposing corner of the container. The device 10 may be pivoted by hand, for example, to reduce the distance between the end 14 of the device 10 and the structure to which it will be mounted. The second member 20" is configured to permit angling of the device 10 as shown and described.

Figure 12:
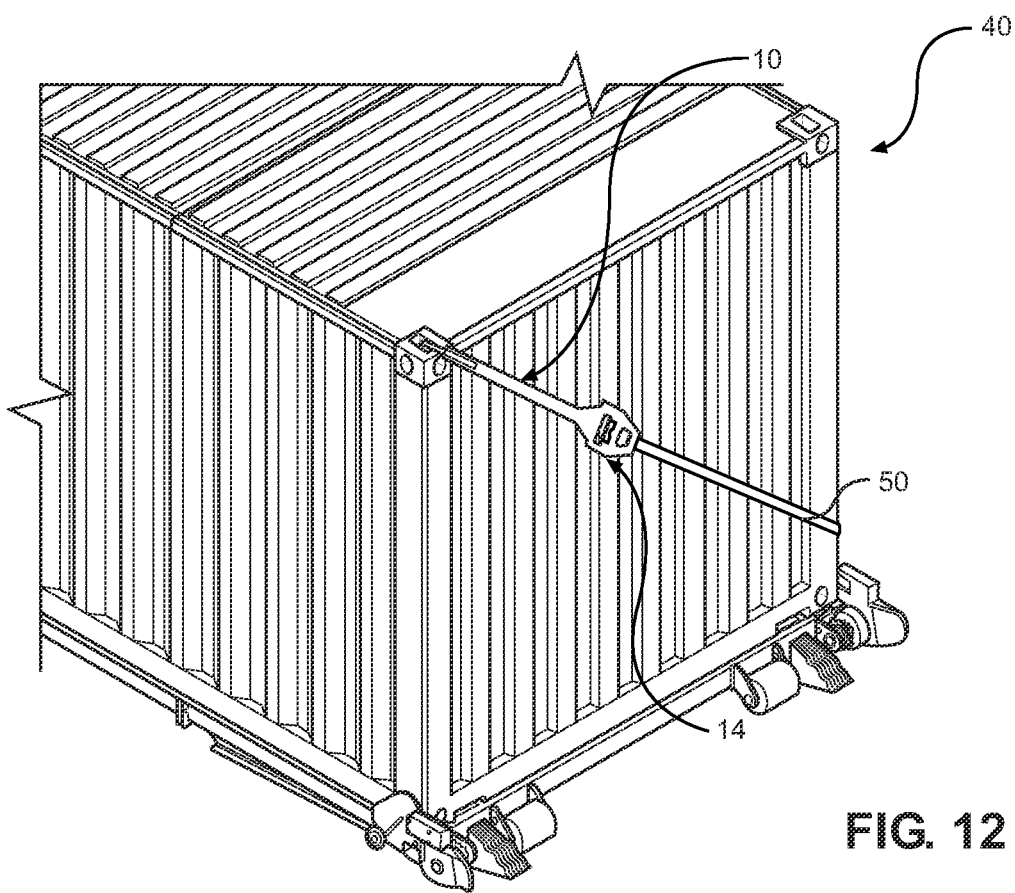
FIG. 12 is a view in perspective illustrating a subsequent step in the installation process to FIG. 11.
Figure 13:
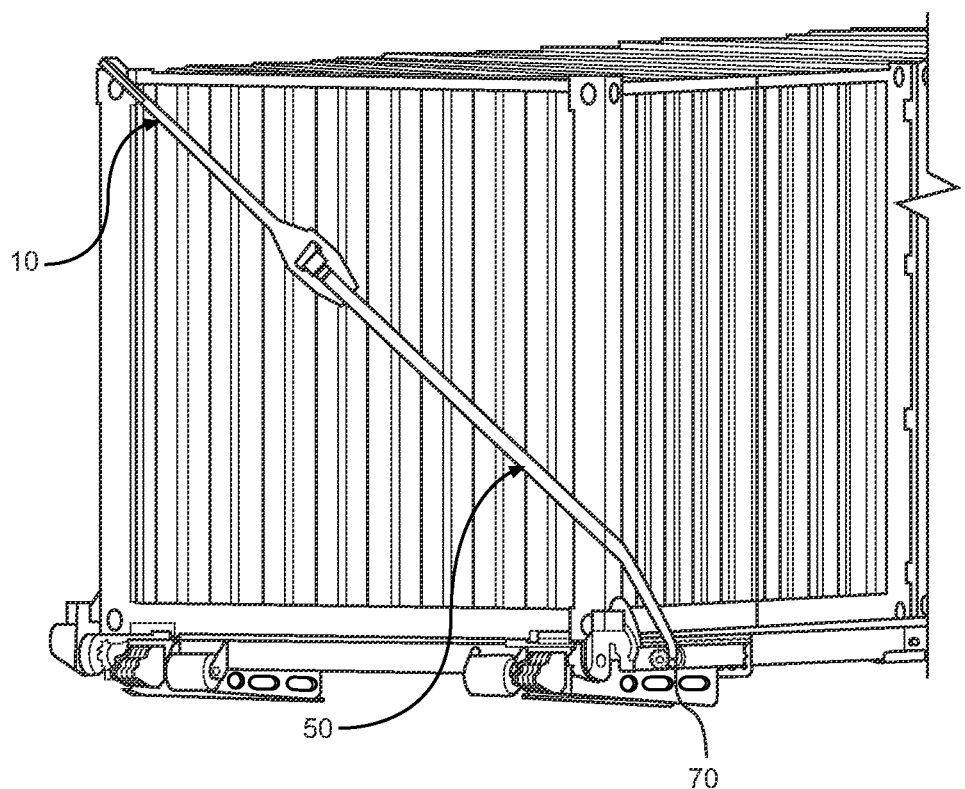
FIG. 13 is a view in perspective illustrating the embodiment of FIG. 12 from another side.

FIGS. 12-13 show the strap 50 extending from the device 10 and attaching to the fixture 70 and tightened against the container 40. In this operable configuration, the second member 20" of the device 10 is disposed within the aperture 32 of the corner casting 30, the strap 50 is mounted to one end 14 of the device 10 and extends to attachment to the fixture 70 that is firmly mounted to the truck, trailer or other structure upon which the container 40 is disposed during transport or storage. The device 10 in this operable position is parallel to the plane of the rear sidewall 42 of the container 40, parallel to the tie-down member 50 and angled relative to horizontal in order to hold down one corner of the container by lashing to an opposite side of the truck, trailer or other structure. The device 10 and strap 50 combination prevents the container 40 from moving substantially in a direction that would create further tension in the strap 50, such as to the left in FIG. 13.

Figure 14:
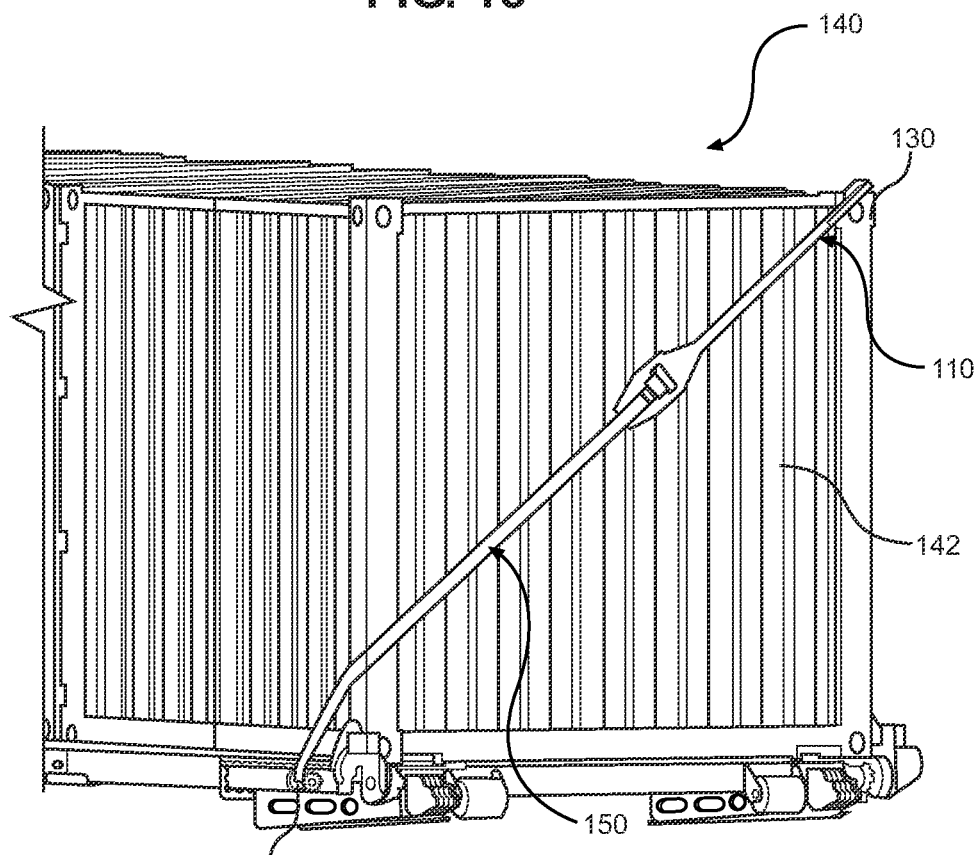
FIG. 14 is a view in perspective illustrating an embodiment of the present invention in which the structures attached to the container are from a different corner to a different corner than that shown in FIG. 13.

Additional tie-downs may be mounted in a similar manner to the device 10 and the strap 50 of the FIG. 13 embodiment. FIG. 14 shows a device 110, which is similar or identical to the device 10, mounted to the container 140 in a similar fashion to the embodiment shown in FIG. 13, except in an opposite direction—from the opposite top corner casting to the opposite lower corner casting. The second member (not visible but identical to the second member 20" of the fastening device 10) of the device 110 is inserted in the upwardly-facing aperture of the corner casting 130 and aligned substantially parallel to the rear sidewall 142. However, instead of extending from the top left to the bottom right of the ISO container as in the embodiment of FIG. 13, the strap 150 extends from the top right to the bottom left to attach to a fixture 170 on the opposite side of the truck or trailer bed. Thus, the embodiment of FIG. 14 maintains the container 140 from moving in a direction that would apply further tension to the strap 150, such as to the right in the embodiment of FIG. 14.

Figure 20:
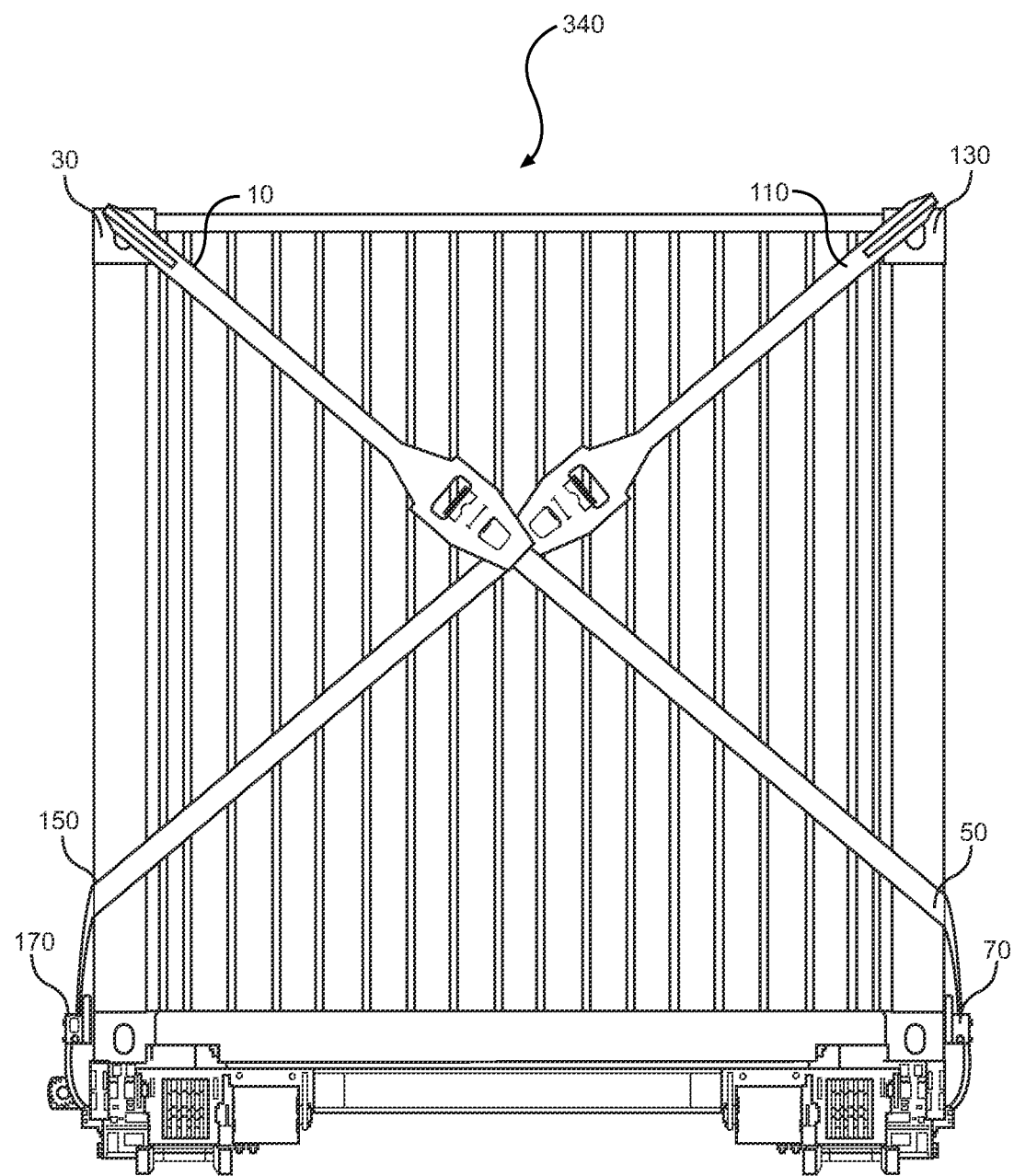
FIG. 20 is an end view of an embodiment of the present invention in an operable position.

The embodiments of FIGS. 13 and 14 may be employed on different containers as shown in FIGS. 13 and 14 or they can both be employed simultaneously on the same container to prevent movement in both directions. When both embodiments are on the same container, as shown in FIG. 20, the straps 50 and 150 may cross in an X-shaped configuration as they extend from opposing upwardly-facing corner castings 30 and 130 and downwardly to opposing fixtures 70 and 170, respectively. This configuration holds an attached container 340 from moving a substantial distance in either of two opposing directions that would apply further tension to either or both of the straps 50 and 150. This configuration also prevents substantial vertical movement away from the truck, trailer or other structure. Thus, such a combination configuration prevents substantial (e.g., more than one inch of) movement in opposing and/or vertical directions.

Figure 16:
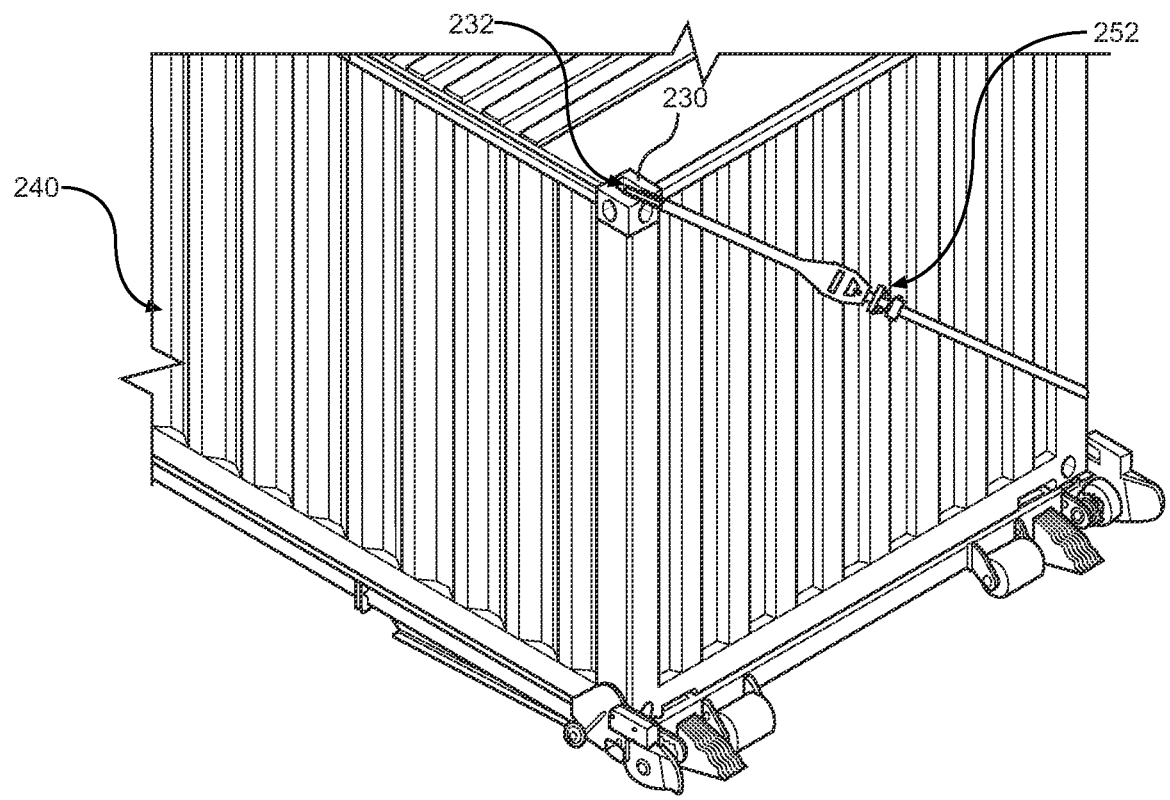
FIG. 16 is a view in perspective illustrating a strap using a ratchet-tightening mechanism, such as a winch, that is part of the strap system.
Figure 17:
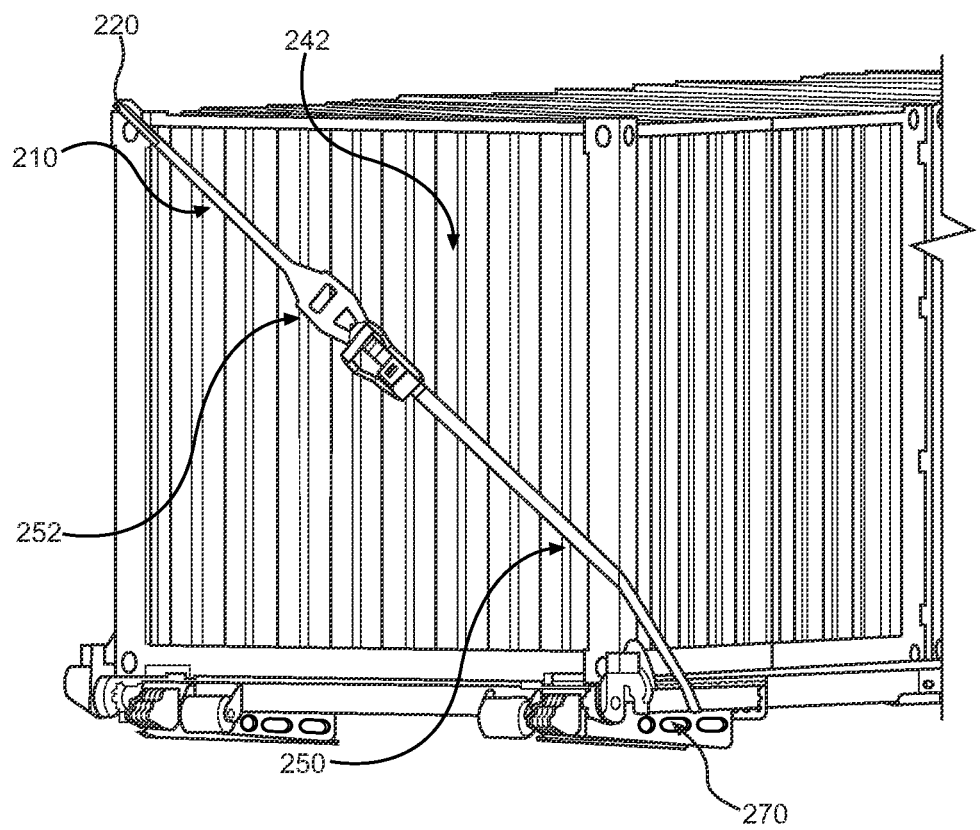
FIG. 17 is view in perspective illustrating the embodiment of FIG. 16 from another side.

As shown in the embodiment of FIGS. 16-17, one or more straps may alternatively be tightened by a ratchet-mechanism 252 commonly used with strap tie-downs on trailers and trucks. In this embodiment, a member of the hook 220 of the device 210 is inserted in the aperture 232 of the corner casting 230. Further, the strap 250 is mounted to one end of the device 210 and also to the fixture 270 mounted to the truck, trailer or other structure upon which the container 240 is mounted during transport or storage. The ratchet 252 is used to tighten the strap 250 in a conventional manner, which secures the device 210 in this position substantially parallel to the plane of the rear sidewall 242 of the container. The combination device 210 and strap 250 prevents the container 240 from moving in a direction that would create further tension in the strap 250, such as to the left in FIG. 16.

In one embodiment, a hook at one end of a ratchet strap mechanism is mounted in the hole 16 of the fastening device, and a hook at the opposite end of the ratchet strap mechanism is hooked around the I-beam, U-shaped beam or other shaped beam on the side of the truck or trailer. When the ratchet mechanism is tightened in a conventional manner, the container is restrained from moving in at least one direction.

This detailed description in connection with the drawings is intended principally as a description of the presently preferred embodiments of the invention, and is not intended to represent the only form in which the present invention may be constructed or utilized. The description sets forth the designs, functions, means and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:
1. A combination of an ISO container attached to a structure, the combination comprising:
(a) a first fastening device having an elongated frame with longitudinally-opposing first and second ends, the second end having a hook member inserted into a first corner casting on a surface of the ISO container that is upwardly-facing in operable position, the first end disposed along a vertical sidewall of the ISO container in operable position; and
(b) a first tie-down member having a first member end attached to the structure and a second member end attached to the first end of the first fastening device;
wherein the first fastening device is at least about two feet long between the hook member and the first end, thereby extending from the first corner casting to a distance an average human user may reach and wherein the second member end extends through at least one aperture formed in the first end of the first fastening device.

2. The combination in accordance with claim 1, wherein the elongated frame of the first fastening device is substantially parallel to the vertical sidewall of the ISO container.

3. The combination in accordance with claim 2, wherein at least a portion of the first tie-down member extends substantially parallel to the elongated frame.

4. The combination in accordance with claim 1, wherein the first member end attaches to the structure through a tie-down member tightener that is mounted to the structure.

5. A combination of an ISO container attached to a structure, the combination comprising:
(a) a first fastening device having an elongated frame with longitudinally-opposing first and second ends, the second end having a hook member inserted into a first corner casting on a surface of the ISO container that is upwardly-facing in operable position, the first end disposed along a vertical sidewall of the ISO container in operable position;
(b) a first tie-down member having a first member end attached to the structure and a second member end attached to the first end of the first fastening device;
(c) a second fastening device having an elongated frame with longitudinally-opposing third and fourth ends, the third end having a hook member inserted into a second corner casting on the surface of the ISO container that is upwardly-facing in operable position and spaced from the first corner casting, the fourth end of the second fastening device is disposed along a vertical sidewall of the ISO container in operable position; and
(d) a second tie-down member having a third member end attached to the structure and a fourth member end attached to the fourth end of the second fastening device, the second tie-down member oriented transverse to the elongated frame of the first fastening device.

6. The combination in accordance with claim 5, wherein the second fastening device is at least about two feet long between the second fastening device hook member and the fourth end, and is substantially rigid, thereby extending from the second corner casting to a distance an average human user may reach.

7. The combination in accordance with claim 5, wherein the elongated frame of the second fastening device is substantially parallel to the vertical sidewall of the ISO container.

8. The combination in accordance with claim 5, wherein at least a portion of the second tie-down member extends substantially parallel to the second fastening device elongated frame.

9. A device for fastening an ISO container to a structure, the device comprising an elongated frame with longitudinally-opposing first and second ends, the second end having a hook member configured for inserting into an opening of a corner casting of the ISO container, at least one aperture formed in the first end and configured to receive a tie-down member that extends from the first end of the device and attaches to the structure, wherein the elongated frame is sufficiently rigid that the device does not deform when held vertically by the first end with the second end above the first end, wherein the device is at least about two feet long between the hook member and the first end, thereby extending from the corner casting to a distance an average human user may reach, wherein the hook is defined by a first hook member that extends transverse to the elongated frame and a second hook member that extends transverse to the first hook member, thereby forming a gap between the elongated frame and the second hook member that is at least as wide as a corner casting wall that is disposed between the opening of the corner casting, into which the second hook member is configured to extend, and the exterior edge of the corner casting.

10. A method of fastening an ISO container to a structure, the method comprising:
(a) attaching a first fastening device to the ISO container, the first fastening device having an elongated frame with longitudinally-opposing first and second ends, the second end having a hook member inserted into a first corner casting on a surface of the ISO container that is upwardly-facing in operable position, the first end of the elongated frame is disposed along a vertical sidewall of the ISO container in operable position;
(b) attaching a first member end of a first tie-down member to the first end of the first fastening device and attaching a second member end of the first tie-down member to the structure;
(c) tightening the first tie-down member, thereby tending to draw the ISO container tightly against the structure;

(d) attaching a second fastening device to the ISO container, the second fastening device having an elongated frame with longitudinally-opposing third and fourth ends, the third end having a hook member inserted into a second corner casting on the surface of the ISO container that is upwardly-facing in operable position and spaced from the first corner casting, the fourth end of the elongated frame is disposed along the vertical sidewall of the ISO container in operable position;

(e) attaching a third member end of a second tie-down member to the fourth end of the second fastening device and attaching a fourth member end of the second tie-down member to the structure; and (f) tightening the second tie-down member until the second tie-down member is oriented transverse to the elongated frame of the first fastening device, thereby tending to draw the ISO container tightly against the structure.

\* \* \* \* \*